Sept. 2, 1941.  P. A. SOLEM  2,254,501
RESILIENT ROLLER
Filed Oct. 7, 1938
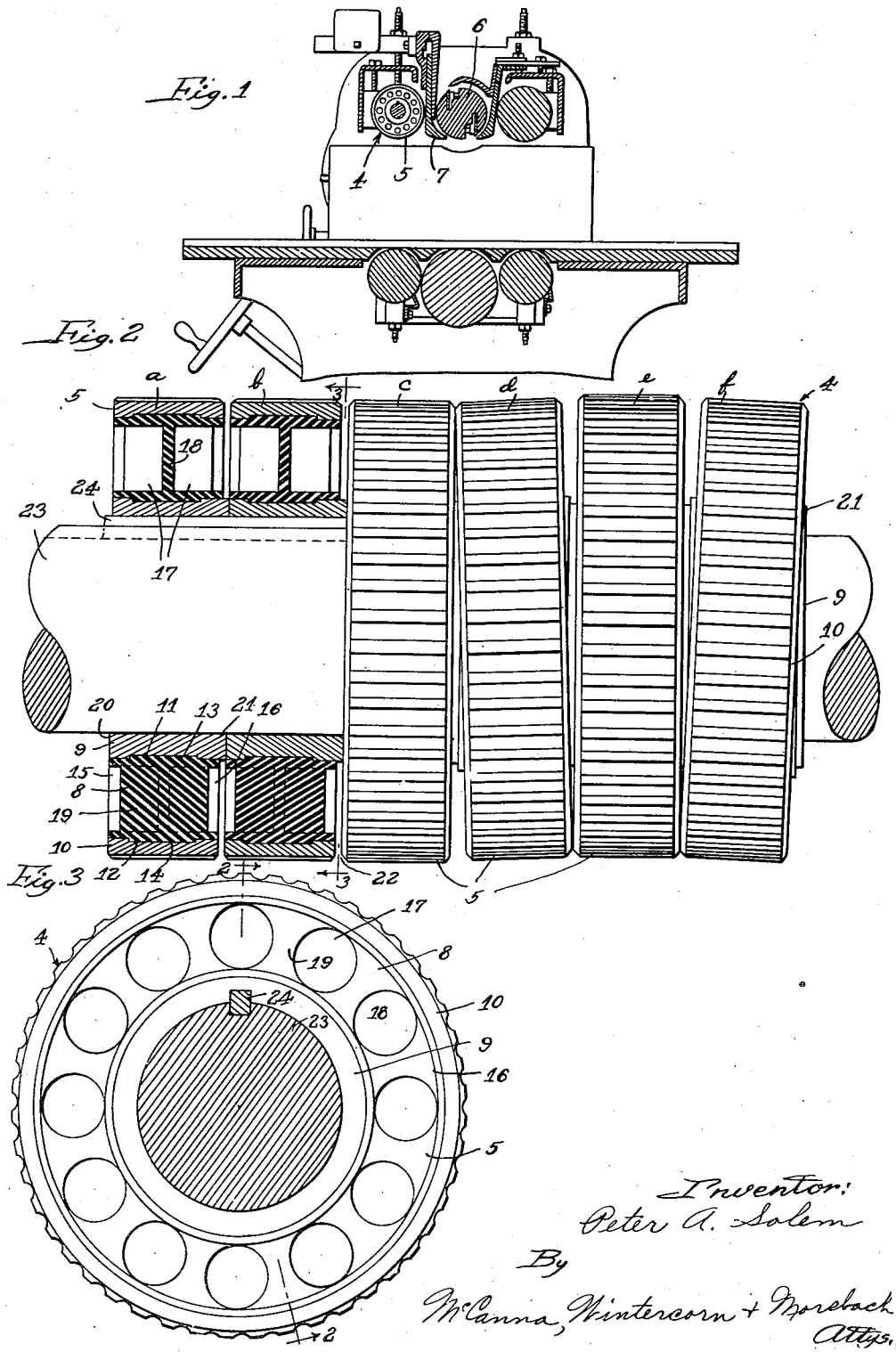
Inventor:
Peter A. Solem
By
McCanna, Wintercorn + Morebach
Attys.

Patented Sept. 2, 1941

2,254,501

UNITED STATES PATENT OFFICE 2,254,501

RESILIENT ROLLER

Peter A. Solem, Rockford, Ill.

Application October 7, 1938, Serial No. 233,715

2 Claims. (Cl. 144—250)

This invention relates to a rubber cushioned resilient roller especially designed for use in multiple in building up sectional feed rolls for woodworking machines, but adapted with little or no modification to be used in various other places wherever rollers having similar characteristics may be desired.

Resilient rollers have heretofore been constructed using coiled springs as the yielding means between radial lugs on the inner hub member and other radial lugs on the outer rim member, but such rollers, besides being quite expensive, were objectionable for various reasons. For one thing, separator plates were invariably necessary between adjacent rollers where they were used in a sectional feed roll so as to keep the coiled springs properly housed and avoid damage to the machine and the work in the event of spring breakage, which was an eventuality that had to be taken into consideration with that sort of construction. Then, too, the coiled springs functioned only as a torsional cushioning means and that only in one direction; the springs were incapable of cushioning radially or against lateral deflection of the rim relative to the hub. Furthermore, it was a practical impossibility to provide for any variation of the spring action should it be desired in one case to have less yield than in another case, without, of course, going to the length of substituting heavier or lighter springs, as the case might be. In these spring-cushioned rollers, eight pieces were required usually in the roller itself, assuming that the six customary springs were used, and adding the spacer plates would total ten pieces in all for the one roller assembly.

It is the principal object of my invention to provide a simple three-piece rubber cushioned roller, a single rubber cushioning core forming the connecting wall or web between the hub and rim parts and taking the place of six or more springs besides eliminating the necessity for the spacer plates. The rubber core is yieldable in all directions, that is to say, torsionally in either direction, radially and laterally. The core is substantially indestructible and is molded in place between the hub and rim and bonded to these parts by vulcanization.

In accordance with another object of my invention, the rubber is cored out at uniformly spaced intervals circumferentially with respect to the roller, primarily to give the desired yieldability, while incidentally saving in rubber stock. By coring out from opposite sides to a predetermined depth and diameter, I am enabled to obtain any degree of yield desired within a wide range without otherwise changing the construction of the roller and without materially affecting the strength and durability of the roller, inasmuch as the rubber core in all instances has the same wide engagement on the outer periphery of the hub and inner periphery of the rim and in every instance has the same width of dovetail connection in an annular external groove in the hub and an annular internal groove in the rim.

The invention is illustrated in the accompanying drawing, wherein—

Fig. 1 is a fragmentary sectional view of a planer equipped with a sectional front feed roller made up of resilient rollers of my invention;

Fig. 2 is a view of a portion of the sectional feed roll, showing four of the rollers in front elevation having the rims thereof disposed in different positions which they are capable of assuming with relation to their hubs in accordance with my invention and showing the remaining two rollers in cross-section on the broken line 2—2 of Fig. 3 to clearly illustrate the construction, and Fig. 3 is a section on the line 3—3 of Fig. 2, showing one of the rollers in side elevation.

The same reference numerals are applied to corresponding parts throughout the views.

While I have illustrated my invention as applied to a sectional front feed roll 4 in a planer where the torsional, radial, and lateral yield of the individual resilient rollers 5 used in making up the feed roll 4 serve to meet all requirements in the efficient feeding of narrow stock of varying thicknesses and shapes to the cutter head 6 past a sectional chip breaker 7, it should soon appear that resilient rollers having the novel characteristics herein disclosed are adapted for a wide variety of purposes when made in different diameters and widths to suit the requirements of such other uses. In other words, I contemplate application of resilient rollers constructed along the lines herein disclosed wherever a rubber core 8 is suitable between the hub 9 and rim 10 of the roller. In order principally to get a rougher surface on the parts for better bonding of the rubber thereon and incidentally make a dovetailed connection between the rubber and the metal of the rim and hub, I prefer to turn an annular external groove 11 in the periphery of the hub 9 and an annular internal groove 12 in the inner periphery of the rim 10. A still better bond is then obtained by brass plating the parts, and the rubber core 8, which is concentric with the hub and rim, is molded in place and "welded" to the brass plated parts by vulcanization. The molded core forms annular peripheral dovetail projections 13 and 14 filling the grooves 11 and 12. The core is annularly recessed on opposite sides, as at 15 and 16, in concentric relation to the hub and rim parts 9 and 10, and in addition is cored out from opposite sides, as indicated at 17, leaving a wall 18 in the median plane of the roller. The cored out holes 17 are shown as circular, but may, of course, be of any desired shape, and are also shown as provided of a diameter equal to the width of the annular recesses 15 and 16, but the size and depth of these holes will vary according to the degree of yieldability desired in the roller. It is also manifest that if I were to omit every alternate hole, it would result in stiffening the roller considerably, and hence it is contemplated to vary size, shape and depth, as well as the number of holes, to obtain variation in the degree of yield throughout a wide range. It goes without saying, also, that in large rollers I may provide the holes in more than one circle. The holes 17 of the one series are illustrated as concentric with the holes in the other series on the opposite side of the core, but, if so desired, I may stagger the holes of one series with relation to the holes in the other series, although the present construction is preferred and is believed to be much stronger because of the solid spoke-like webs 19 provided between adjacent holes and extending substantially the full width of the core, as appears in Fig. 2. It is considered preferable to end the holes 17 short of one another so as to leave the wall 18 between the bottoms thereof, because this wall adds greatly to the strength of the core by interconnecting the adjacent spokes 19, as well as the rim and hub portions of the core.

In operation, it should be clear that the rubber core 8 permits restrained universal movement of the rim 10 with respect to the hub 9. The core yields in all directions, and while I have mentioned torsional, radial and lateral yieldability, because it is in those respects that the roller is specially adapted for use in a sectional feed roll in planers and other woodworking machines, it should be apparent that the rim 10 may also be moved axially in either direction with respect to the hub 9 by virtue of the lateral yieldability of the core 8. There will not ordinarily be any occasion for such movement of the rim 10 of a roller in a sectional feed roll; there the lateral yieldability of the core will assert itself only to the extent of permitting the rims 10 to cock angularly to one side or the other relative to the hubs, as illustrated by the rollers d and f in Fig. 2. Radial yieldability of the rollers is illustrated by the roller e in Fig. 2, the rim of which is shown deflected out of concentric relation with the rims of the rollers a, b and c, for example. There may, of course, be a compound deflection radially and laterally which has not been illustrated but which is thought to be self-evident from the showing of the rollers d, e and f. Torsional deflection of the rim of a roller with respect to its associated hub is not shown, but it should be apparent from inspection of Fig. 3 that torsional deflection is possible in either direction by reason of the rubber core 8. In all cases, the stresses set up in the core 8 incident to deflection of the rim relative to the hub are distributed substantially throughout the entire circumference of the core. Thus, in the case of radial deflection as, for example, in the case of the roller e in Fig. 2, there is compression of the core 8 in one half of the roller whereas the other half of the core is stretched, due to the temporary eccentric relationship of the rim 10 relative to the hub 9. The entire core, as a matter of fact, is more or less distorted under such deflection. The firm bond between the rubber core and the metal rim and hub is not affected in the least by this distortion. As another example, consider rollers d and f in Fig. 2 which are cocked laterally: In those cases, the core is stretched sidewise in one direction on one side of the center of the roller and in the opposite direction on the opposite side of center. In every instance the stresses are so distributed throughout the core 8 that there is no danger of damage being done to the core under ordinary or even extreme service conditions. The rubber core therefore contrasts greatly in its operation with the operation of the springs in the spring-cushioned rollers, because in most instances only one or two springs were apt to be assuming the load at any one time, and, as a result, the springs were subject to frequent breakage.

Rollers constructed in accordance with my invention have one end 20 of the hub 9 flush with one end of the rim 10, but the other end 21 of the hub projects beyond the plane of the associated end of the rim 10 to the extent that it is desired to space the rims of adjacent rollers in the sectional feed roll, as indicated at 22 in Fig. 2. This spacing is sufficient to allow the usual amount of cocking of the rims of the rollers laterally in the operation of the feed roll, and, of course, the larger the diameter of the rollers, the greater will be the spacing of the rims to allow for the same angularity of deflection. This construction is made possible by the elimination of the coiled compression springs and the elimination of the intermediate spacing plates or disks. With the rubber core, there is nothing apt to break and hence there is no need for enclosing the opposite sides of the rollers. The rollers all have their hubs 9 keyed on the shaft 23, as at 24. While the shaft 23 in the case of a feed roll is the driving shaft, and drive is accordingly transmitted from the hub 9 of each roller through the rubber core 8 to the rim 10, it should be understood that in certain other applications of my invention the direction of drive may be reversed, and in still other applications the rollers may be mounted to rotate freely with respect to the shaft or axle on which the same are mounted.

In conclusion, I also desire to call attention to the fact that a sectional feed roller utilizing rubber cushioned rollers, as herein disclosed, will operate much more smoothly and quietly than one made up of rollers using coiled compression springs as the cushioning means. Furthermore, less power is consumed in the operation of a feed roll using rubber cushioned rollers, because of the elimination of sliding friction between the rim and hub parts of the rollers and the fact that the roller operates at all times more nearly in balance, due to the fact that the rubber cores in the individual rollers cause an instantaneous rebound of the rims back to concentricity with the roll after the piece of stock which caused the deflection has passed the roll. Generally speaking, rubber cushioned rollers like the ones herein disclosed are adapted for many uses because of their smooth and quiet operation and their vibration dampening effect, where the old spring-cushioned rollers would be unsuited.

It is believed the foregoing description conveys a good understanding of the objects and advantages of my invention. The appended claims have been drawn with a view to covering all legitimate modifications and adaptations, having especially in mind that the present application of the invention to a sectional feed roll for woodworking machines is only one of a wide range of applications for which the present resilient roller is adapted.

I claim:

1. In combination, a shaft and a plurality of like resilient rollers mounted on said shaft and adapted to rotate therewith, each of said rollers comprising a hub member encircling the shaft, a rim member normally in concentric relation with the hub and an annular rubber core between and positively connected to the hub and rim to transmit drive resiliently from the hub to the rim while permitting universal deflection of the rim with respect to the hub under restraint of the compressed, stretched and otherwise distorted portions of the annular rubber core, said rollers being mounted side by side on said shaft with their hub members in contact and with their rim members as well as their cores in spaced substantially parallel relation, said core of each of said rollers having two series of circumferentially spaced transverse holes formed therein in opposite sides thereof of such size and number in relation to the radial width, diameter and thickness of the core to render said core susceptible of deflection under a predetermined load, the holes of both series terminating short of the middle of the core.

2. In combination, a shaft and a plurality of resilient rollers mounted on said shaft and adapted to rotate therewith, each of said rollers comprising a hub member encircling the shaft, a rim member normally in concentric relation with the hub and an annular rubber core between and connected circumferentially to the hub and rim to transmit drive resiliently from the hub to the rim while permitting universal deflection of the rim with respect to the hub under restraint of the compressed, stretched and otherwise distorted portions of the annular rubber core, said rollers being mounted side by side on said shaft with their hub members in contact and with their rim members as well as their cores in spaced substantially parallel relation, said core of each of said rollers having circumferentially spaced transverse holes formed therein of such size and number in relation to the radial width, diameter and thickness of the core to render said core susceptible of deflection under a predetermined load.

PETER A. SOLEM.